United States Patent
Singh et al.

(10) Patent No.: US 11,797,214 B2
(45) Date of Patent: Oct. 24, 2023

(54) MICRO-BATCHING METADATA UPDATES TO REDUCE TRANSACTION JOURNAL OVERHEAD DURING SNAPSHOT DELETION

(71) Applicant: VMware, Inc., Palo Alto, CA (US)

(72) Inventors: Pranay Singh, San Ramon, CA (US); Enning Xiang, San Jose, CA (US); Wenguang Wang, Santa Clara, CA (US); Fan Ni, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 110 days.

(21) Appl. No.: 17/646,993

(22) Filed: Jan. 4, 2022

(65) Prior Publication Data
US 2023/0214146 A1    Jul. 6, 2023

(51) Int. Cl.
G06F 3/06 (2006.01)

(52) U.S. Cl.
CPC ............ *G06F 3/0652* (2013.01); *G06F 3/064* (2013.01); *G06F 3/0604* (2013.01); *G06F 3/0679* (2013.01)

(58) Field of Classification Search
CPC ...... G06F 3/0652; G06F 3/0604; G06F 3/064; G06F 3/0679
See application file for complete search history.

(56) References Cited

U.S. PATENT DOCUMENTS

| | | | | |
|---|---|---|---|---|
| 2012/0317377 A1* | 12/2012 | Palay | ................ | G06F 12/0246 711/E12.001 |
| 2016/0313926 A1* | 10/2016 | Mutha | ................ | G06F 11/3442 |
| 2019/0188124 A1* | 6/2019 | Ferrante | ............. | G06F 12/0246 |
| 2023/0169036 A1* | 6/2023 | Xiang | ................ | G06F 16/128 707/692 |

* cited by examiner

*Primary Examiner* — Francisco A Grullon
(74) *Attorney, Agent, or Firm* — Dinsmore & Shohl LLP

(57) ABSTRACT

A method for deleting one or more snapshots using micro-batch processing is provided. The method includes receiving a request to delete the one or more snapshots, identifying one or more middle map extents exclusively owned by the one or more snapshots requested to be deleted, wherein metadata for the one or more snapshots is stored in one or more logical maps having logical map extents mapping logical block addresses (LBAs) to middle block addresses (MBAs) and a middle map having middle map extents mapping MBAs to physical block addresses (PBAs) of physical locations where data blocks are written, adding MBAs of the identified one or more middle map extents in a batch, determining a first micro-batch including a first subset of the MBAs in the batch, the first subset of MBAs being MBAs less than a first upper bound MBA, and using a first transaction to delete the middle map extents corresponding to the first subset of MBAs included in the first micro-batch.

20 Claims, 9 Drawing Sheets

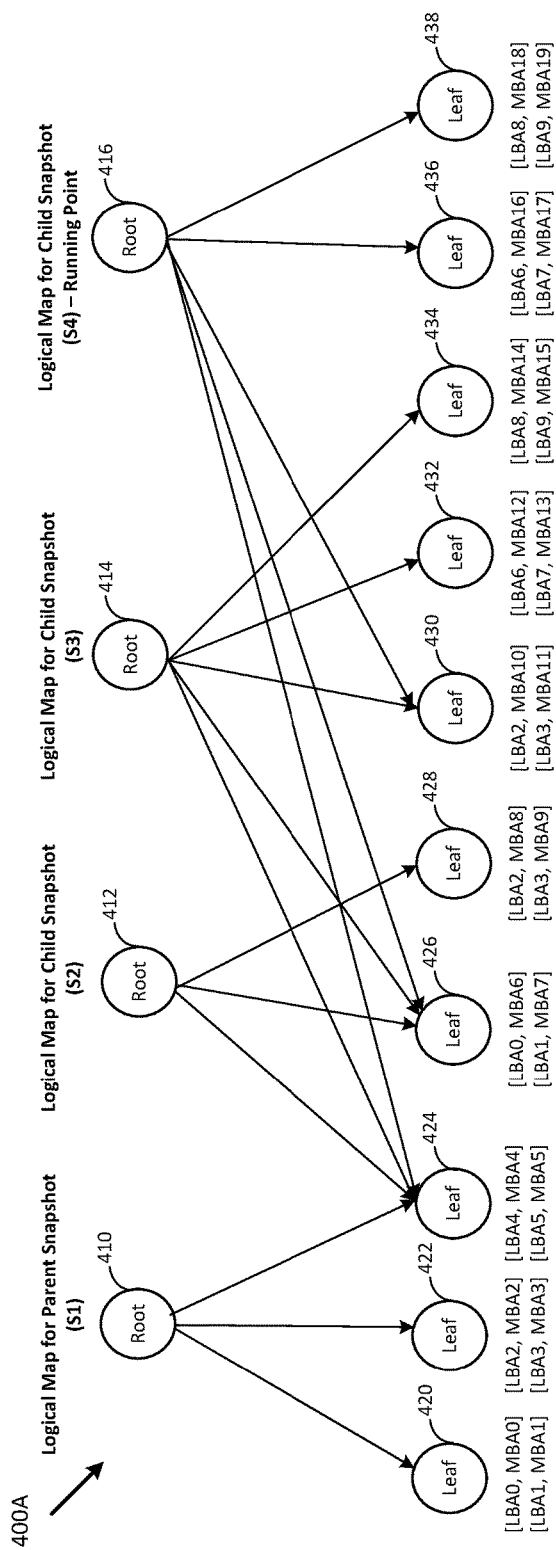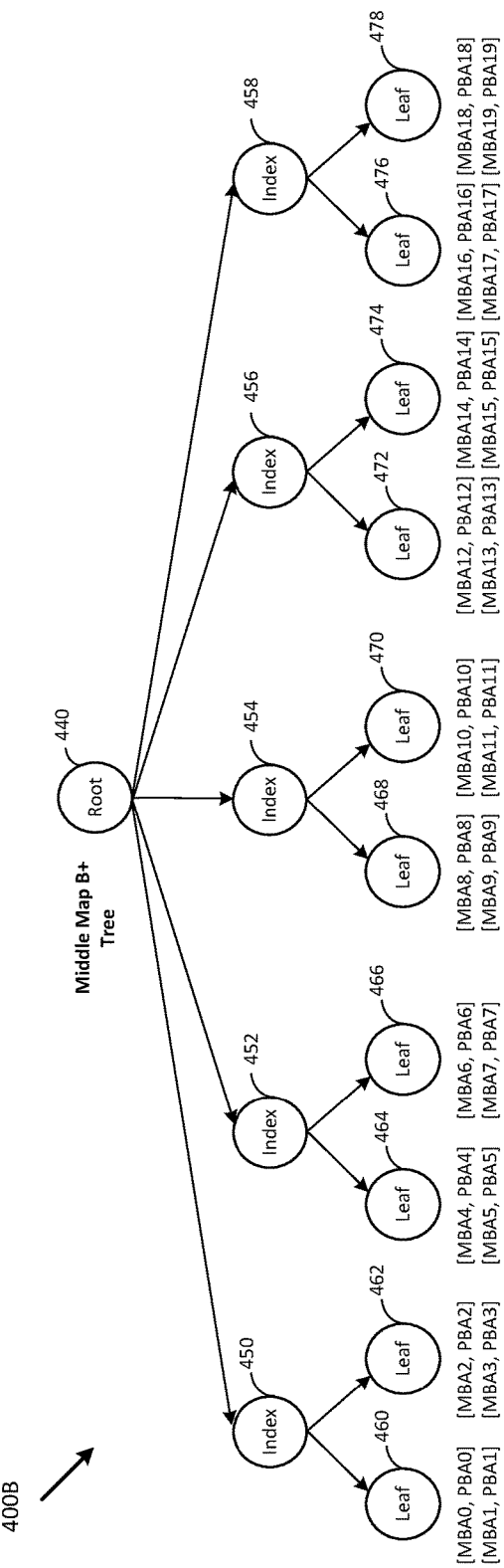
FIGURE 4A
FIGURE 4B

Figure 6:
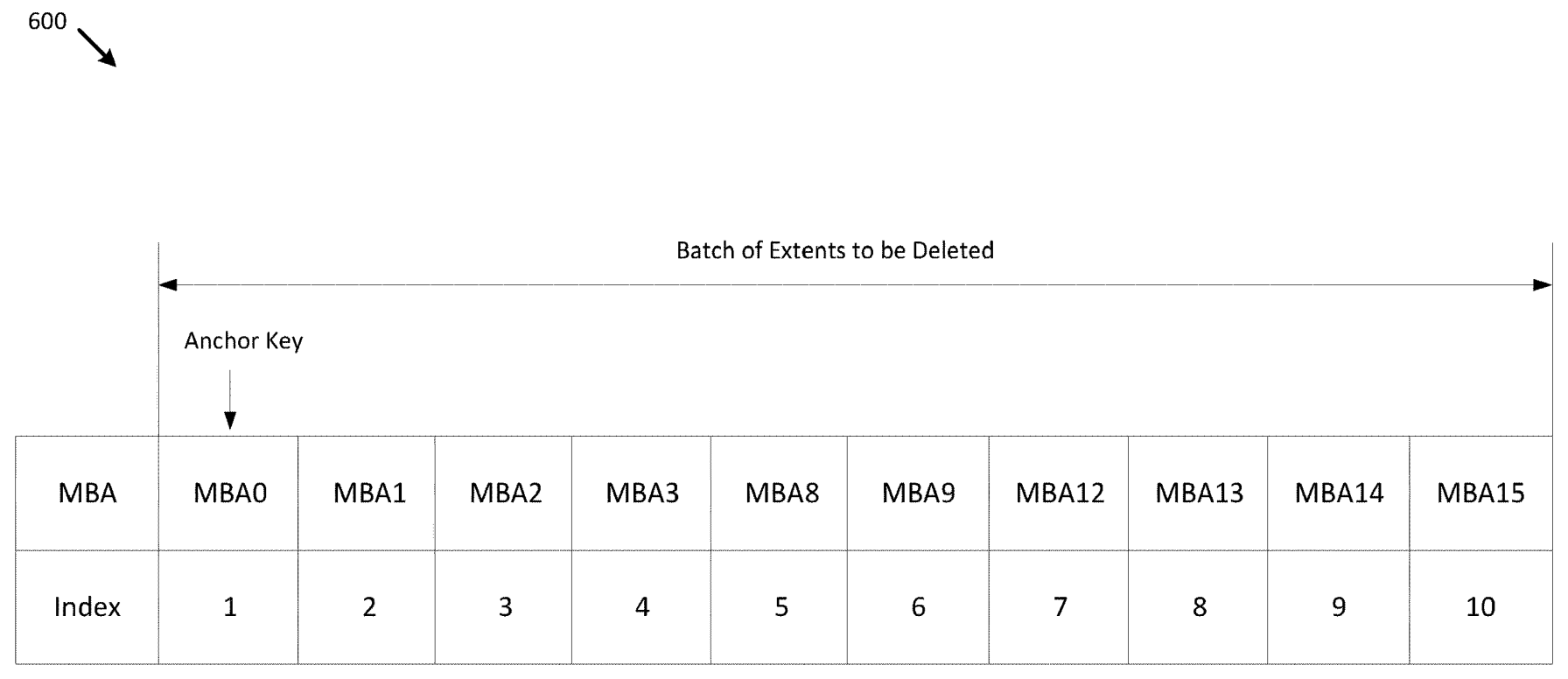

| MBA | MBA0 | MBA1 | MBA2 | MBA3 | MBA8 | MBA9 | MBA12 | MBA13 | MBA14 | MBA15 |
|---|---|---|---|---|---|---|---|---|---|---|
| Index | 1 | 2 | 3 | 4 | 5 | 6 | 7 | 8 | 9 | 10 |

Anchor Key → MBA0

Batch of Extents to be Deleted

MICRO-BATCHING METADATA UPDATES TO REDUCE TRANSACTION JOURNAL OVERHEAD DURING SNAPSHOT DELETION

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs).

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely or in part be stored as pointers to the data blocks that existed when the snapshot was created. Each snapshot may include its own logical map (interchangeably referred to herein as a "snapshot logical map") storing its snapshot metadata, e.g., a mapping of LBAs to PBAs, or its own logical map and middle map (interchangeably referred to herein as a "snapshot middle map") storing its snapshot metadata, e.g., mapping of LBAs to middle block addresses (MBAs) which are further mapped to PBAs, stored concurrently by several compute nodes (e.g., metadata servers). Where a logical map has not been updated from the time a first snapshot was taken to a time a subsequent snapshot was taken, snapshot logical maps may include identical mapping information for the same LBA (e.g., mapped to the same MBA and PBA). In other words, data blocks may be either owned by a snapshot or shared with a subsequent snapshot (e.g., created later in time).

Occasionally, snapshots may be deleted. Deleting a snapshot may remove data blocks exclusively owned by the snapshot but not remove data blocks shared with another snapshot.

A transaction may be used to perform such snapshot deletion. A transaction is a set of operations that form a logical unit of work. The essential idea of a transaction is indivisibility, i.e., either all or none of the operations of the transaction are permanently performed. Transaction semantic is defined by atomicity, consistency, integrity, and durability (referred to as "ACID" properties). For example, snapshot deletion may make use of a transaction for its durability, or in other words, to ensure that changes made to the database that are successfully committed will survive permanently, even in the case of system failures.

Durability is achieved through the use of transaction journaling. In particular, transaction journaling provides the capability to prevent permanent data loss following a system failure. A transaction journal, also referred to as a log, is a copy of database updates in a chronological order. In the event of such a failure, the transaction journal may be replayed to restore the database to a usable state. Transaction journaling preserves the integrity of the database by ensuring that logically related updates are applied to the database in their entirety or not at all. In some cases, the transaction journal is a REDO log which describes how to apply the update in case the data updates do not appear on the disk.

During snapshot deletion, one or more pages from the VSAN datastore are loaded into memory, where the pages included metadata of such snapshots to be deleted. As used herein, a page refers to an amount of data, which may be stored in memory. In certain aspects, a page may refer to the smallest unit of memory for which certain input/output (I/O) can be performed. In certain aspects, a page may refer to a block of data, or a plurality of blocks of data. In certain aspects, a page has a fixed length. The pages loaded in memory may be modified to remove metadata for data blocks exclusively owned by snapshot(s) being deleted. Pages in the memory that have been modified are marked as "dirty" and have to be flushed to the disk before they can be freed. However, when performing transaction processing using REDO logs, uncommitted "dirty" pages need to first be journaled prior to flushing the pages to the disk.

Accordingly, where a transaction is used to perform snapshot deletion for a large number of snapshots and the number of data blocks determined to be exclusively owned by each snapshot to be deleted is substantial, a large number of pages may be modified (or "dirtied") and need to be journaled prior to writing the update to the disk. This increase in transaction journaling may adversely affect the database system performance. In particular, an increase in the journaling of data increases an amount of memory resources needed to perform such journaling, which in some cases, may starve other transactions of resources. Further, a decrease in the availability of memory resources may cause a delay in system performance.

For this reason, there is a need in the art for improved techniques to delete snapshots using a transaction.

It should be noted that the information included in the Background section herein is simply meant to provide a reference for the discussion of certain embodiments in the Detailed Description. None of the information included in this Background should be considered as an admission of prior art.

BRIEF DESCRIPTION OF THE DRAWINGS

FIG. 4A is a COW B+ tree used to manage logical map extents for the logical address to middle address mapping of each of the four snaphsots illustrated in FIG. 3, according to an example embodiment of the present application.

FIG. 4B is a B+ tree used to manage middle map extents for the middle address to physical address mapping for each of the four snapshots illustrated in FIG. 3, according to an example embodiment of the present application.

FIGS. 6-9 illustrate an example process for the deletion of snapshots using micro-batch processing, according to an example embodiment of the present application.

DETAILED DESCRIPTION

Figure 1:
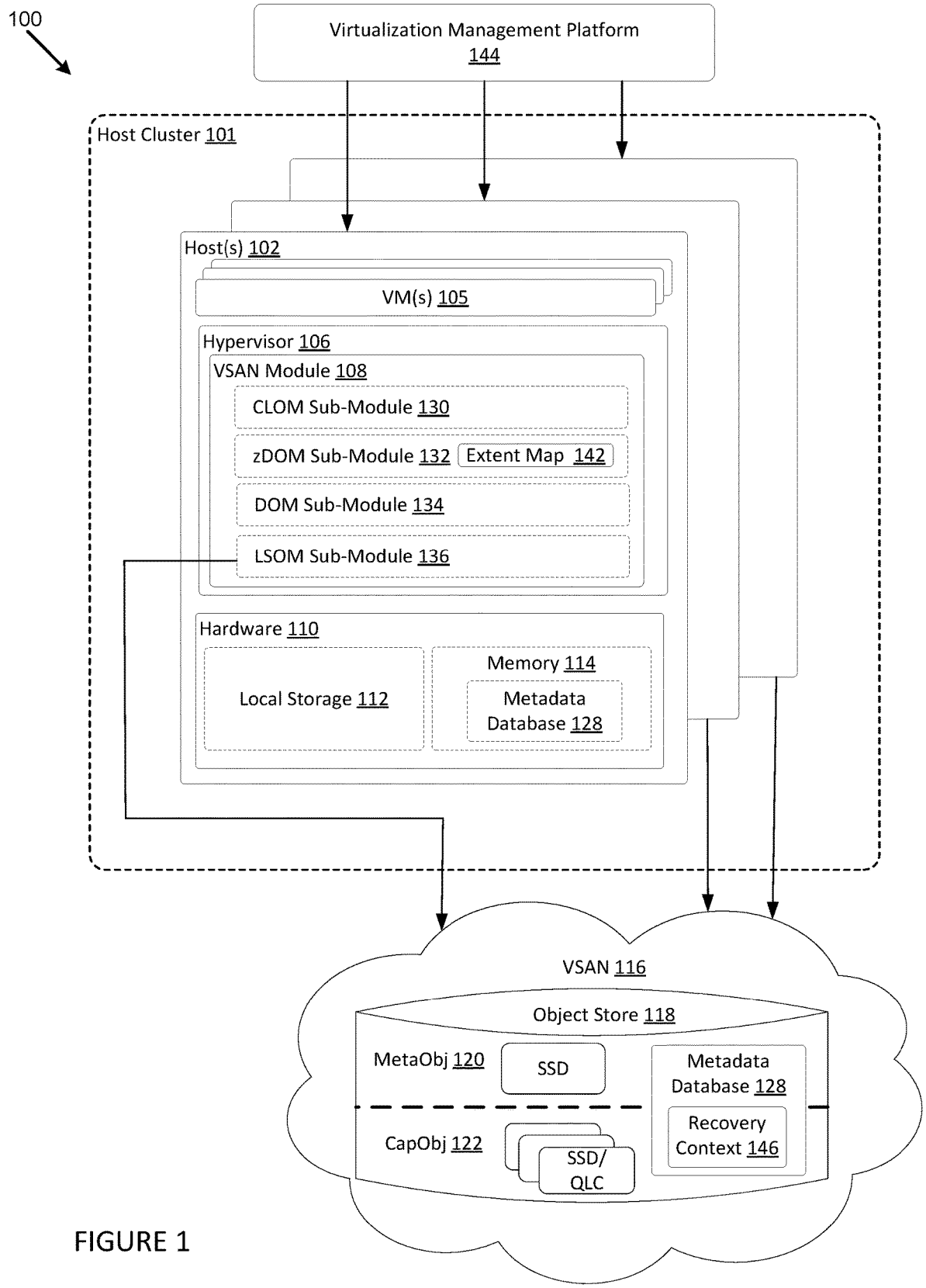
FIG. 1 is a diagram illustrating an example computing environment in which embodiments of the present application may be practiced.

Aspects of the present disclosure introduce improved techniques for snapshot deletion using micro-batch processing. As used herein, micro-batch processing refers to the practice of collecting data in small groups (e.g., "micro-batches") for the purposes of taking action on (e.g., processing) that data. In particular, extents associated with data blocks exclusively owned by snapshots to be deleted are collected in a batch (such as an array) to respect transaction limits and further split into smaller batches (interchangeably referred to herein as a "micro-batch") for deletion. In addition, to reduce transaction journaling of metadata for the deletion of such extents allocated to each micro-batch, aspects of the present disclosure present techniques for assigning extents, associated with data blocks to be deleted, to different micro-batches (e.g., in some cases with different sizes) based on locality of the data blocks, such that a number of pages to be updated when processing each micro-batch is minimized.

As described in more detail below, metadata for snapshots may be maintained in a two-layer data block (e.g., snapshot extent) mapping architecture, where an extent is a specific number of contiguous data blocks allocated for storing information. The first layer of the two-layer mapping architecture may include snapshot logical map(s), while the second layer includes a snapshot middle map. In other words, only one middle map may exist to manage block address mapping from MBAs to PBAs, while each snapshot may have its own logical map. In a snapshot logical map, instead of a logical block address (LBA) of a data block being mapped directly to a physical block address (PBA), LBA(s) of data block(s) are mapped to a middle block address (MBA) of the middle map. Thus, the logical map maintains logical map extents storing tuples of <LBA, MBA>, where the LBA is the key and the MBA is the value. As used herein, a key is an identifier of data and a value is either the data itself or a pointer to a location (e.g., in memory or on disk) of the data associated with the identifier. Similarly, the middle map maps the MBA to the PBA where the data block is written. Thus, the middle map maintains middle map extents storing tuples of <MBA, PBA>, where the MBA is the key and the PBA is the value.

In certain aspects, snapshot metadata, e.g., the mapping of LBAs to MBAs to PBAs, maintained for each snapshot is stored concurrently by several compute nodes (e.g., metadata servers). In particular, a B+ tree may be used to manage logical map extents for the logical address to middle address mapping of each snapshot, while another B+ tree may be used to manage middle map extents for the middle address mapping to the physical address mapping for all snapshots. A B+ tree is a multi-level data structure having a plurality of nodes, each node containing one or more key-value pairs stored as tuples (e.g., <key, value>).

As mentioned previously, only data blocks exclusively owned by snapshots being deleted may be removed when performing snapshot deletion. Accordingly, only middle map extents pointing to data blocks exclusively owned by the snapshots being deleted may be deleted. Such middle map extents added to a batch for transaction processing may belong to multiple pages; thus, multiple pages may need to be modified, and subsequently journaled, to complete the transaction.

Accordingly, to reduce transaction journaling overhead when deleting snapshots, a batch of extents to be deleted may be split into smaller micro-batches for deletion, and a threshold number of pages that can be modified may be configured for each micro-batch. To efficiently delete such extents while adhering to the threshold number of pages limit, techniques described herein may make use of the locality of data blocks to determine which extents may be added to a micro-batch for processing (e.g., deletion). Locality of reference, also known as the principle of locality, is the tendency to access the same set of storage locations repetitively over a short period of time. In particular, spatial locality refers to the use of data within relatively close storage locations and temporal locality refers to the tendency to access memory or storage locations that have been used recently. Exploiting locality of data blocks owned by the snapshot being deleted when determining which extents are to be added to a micro-batch for processing may help to reduce the number of pages which need to be modified and journaled, thereby decreasing the transaction journal overhead. Specifically, FIGS. 3-8 described below, illustrate an example process for the deletion of snapshots using micro-batch processing which exploits locality of data blocks being deleted when determining which extents are to be added to a micro-batch for processing.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

In certain embodiments, in-memory metadata database 128 may include a recovery context 146. As described in more detail below, recovery context 146 may maintain a directory of one or more index values. As used herein, an index value may be recorded at a time after processing a micro-batch such that if a crash occurs during the processing of a subsequent micro-batch, determining which extents have been deleted and which extents still need to be deleted after recovering from the crash may be based on the recorded index value.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In certain embodiments, VSAN module 108 (and, in certain embodiments, more specifically, zDOM sub-module 132 of VSAN module 108, described in more detail below) may be configured to delete one or more snapshots created in a chain of snapshot. According to aspects described herein, z-DOM sub-module 132 may be configured to perform the deletion of one or more snapshots using micro-batch processing. As described in more detail below, to reduce transaction journaling overhead when deleting snapshots, zDOM sub-module 132 may be configured to split a batch of extents to be deleted into smaller micro-batches for deletion, where each micro-batch is configured with a threshold number of pages that can be modified. To efficiently delete such extents while adhering to the threshold number of pages limit, zDOM sub-module 132 may make use of the locality of data blocks to determine which extents may be added to each micro-batch for processing (e.g., deletion).

Various sub-modules of VSAN module 108, including, in some embodiments, CLOM sub-module 130, distributed object manager (DOM) sub-module 134, zDOM sub-module 132, and/or local storage object manager (LSOM) submodule 136, handle different responsibilities. CLOM submodule 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136 of FIG. 1).

In some embodiments, zDOM sub-module 132 stores and accesses an extent map 142. Extent map 142 provides a mapping of LBAs to PBAs, or LBAs to MBAs to PBAs. Each physical block having a corresponding PBA may be referenced by one or more LBAs.

In certain embodiments, for each LBA, VSAN module 108, may store in a logical map of extent map 142, at least a corresponding PBA. As mentioned previously, the logical map may store tuples of <LBA, PBA>, where the LBA is the key and the PBA is the value. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value.

Logical and middle maps may also be used in snapshot mapping architecture. In particular, each snapshot included in the snapshot mapping architecture may have its own snapshot logical map. Where a logical map has not been updated from the time a first snapshot was taken to a time a subsequent snapshot was taken, snapshot logical maps may include identical tuples for the same LBA. As more snapshots are accumulated over time (i.e., increasing the number of snapshot logical maps), the number of references to a same PBA extent may increase. Accordingly, numerous metadata write I/Os at the snapshot logical maps needed to update the PBA for LBA(s) of multiple snapshots (e.g., during segment cleaning) may result in poor snapshot performance at VSAN 116. For this reason, the two-layer snapshot mapping architecture, including a middle map, may be used to address the problem of I/O overhead when dynamically relocating physical data blocks.

For example, data block content referenced by a first LBA, LBA1, of three snapshots (e.g., snapshot A, B, and C) may all map to a first MBA, MBA1, which further maps to a first PBA, PBA1. If the data block content referenced by LBA1 is moved from PBA1 to another PBA, for example, PBA10, due to segment cleaning for a full stripe write, only a single extent at a middle map may be updated to reflect the change of the PBA for all of the LBAs which reference that data block. In this example, a tuple for MBA1 stored at the middle map may be updated from <MBA1, PBA1> to <MBA1, PBA10>. This two-layer snapshot extent architecture reduces I/O overhead by not requiring the system to update multiple references to the same PBA extent at different snapshot logical maps. Additionally, the two-layer snapshot extent architecture removes the need to keep another data structure to find all snapshot logical map pointers pointing to a middle map.

Embodiments herein are described with respect to the two-layer snapshot extent architecture having both a logical map and a middle map.

In certain embodiments, the logical map(s) and the middle map of the two-layer snapshot extent mapping architecture are each a B+ tree. B+ trees are used as data structures for storing the metadata.

Figure 2A:
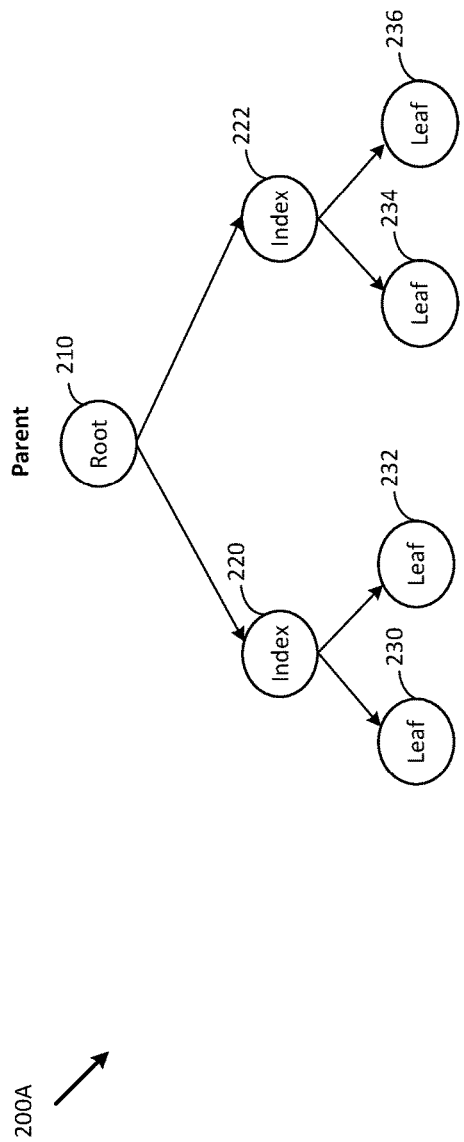
FIG. 2A is a block diagram illustrating a B+ tree data structure, according to an example embodiment of the present application.

FIG. 2A is a block diagram illustrating a B+ tree 200A data structure, according to an example embodiment of the present application. As illustrated, B+ tree 200A may include a plurality of nodes connected in a branching tree structure. Each node may have one parent and two or more children. The top node of a B+ tree may be referred as root node 210, which has no parent node. The middle level of B+ tree 200A may include middle nodes 220 and 222, which may have both parent and child nodes. In the illustrated example, B+ tree 200A has only two levels, and thus only a single middle level, but other B+ trees may have more middle levels and thus greater heights. The bottom level of B+ tree 200A may include leaf nodes 230-236 which do not have any more children. In the illustrated example, in total, B+ tree 200A has seven nodes, two levels, and a height of three. Root node 210 is in level two of the tree, middle (or index) nodes 220 and 222 are in level one of the tree, and leaf nodes 230-236 are in level zero of the tree.

Each node of B+ tree 200A may store at least one tuple. In a B+ tree, leaf nodes may contain data values (or real data) and middle (or index) nodes may contain only indexing keys. For example, each of leaf nodes 230-236 may store at least one tuple that includes a key mapped to real data, or mapped to a pointer to real data, for example, stored in a memory or disk. In a case where B+ tree 200A is a logical map B+ tree, the tuples may correspond to key-value pairs of <LBA, MBA> mappings for data blocks associated with each LBA. In a case where B+ tree 200A is a middle map B+ tree, the tuples may correspond to key-value pairs of <MBA, PBA> mappings for data blocks associated with each MBA. In some embodiments, each leaf node may also include a pointer to its sibling(s), which is not shown for simplicity of description. On the other hand, a tuple in the middle nodes and/or root nodes of B+ tree 200A may store an indexing key and one or more pointers to its child node(s), which can be used to locate a given tuple that is stored in a child node.

Because B+ tree 200A contains sorted tuples, a read operation such as a scan or a query to B+ tree 200A may be completed by traversing the B+ tree relatively quickly to read the desired tuple, or the desired range of tuples, based on the corresponding key or starting key.

In certain embodiments, a B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and ancestor snapshots one or more extents by having a B+ tree index node, exclusively owned by the child B+ tree, point to shared parent and/or ancestor B+ tree nodes. This COW approach for the creation of a child B+ tree may be referred to as a "lazy copy approach" as the entire logical map B+ tree of the parent snapshot is not copied when creating the child B+ tree.

Figure 2B:
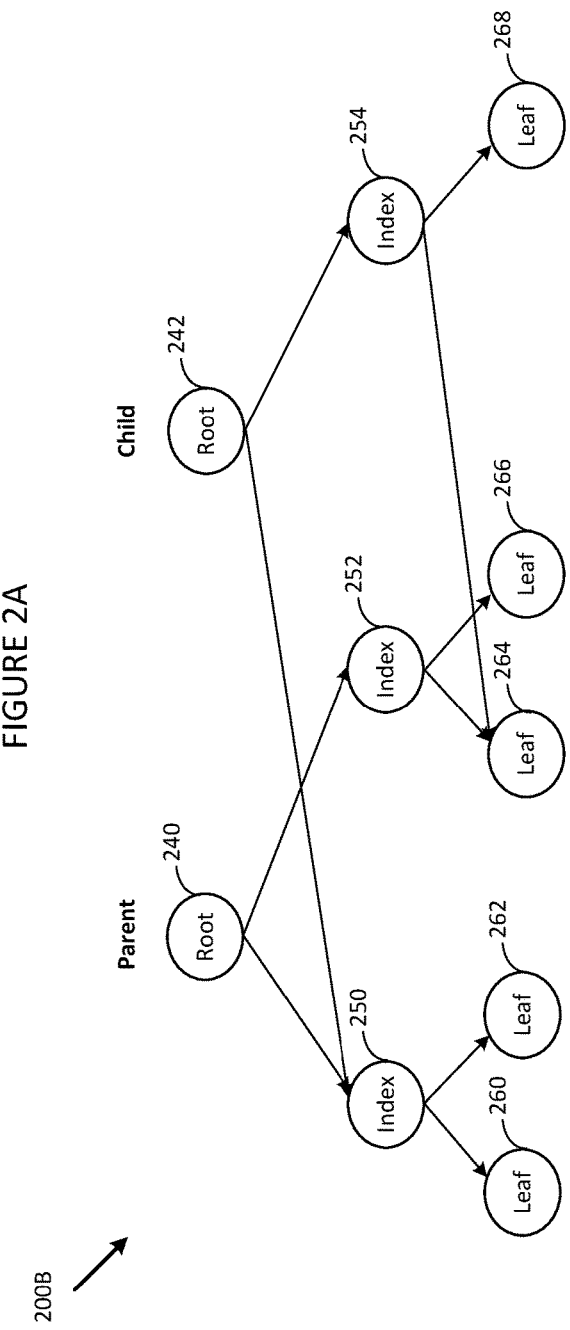
FIG. 2B is a block diagram illustrating a B+ tree data structure using a copy-on-write (COW) approach, according to an example embodiment of the present application.

FIG. 2B is a block diagram illustrating a B+ tree data structure 200B using a COW approach, according to an example embodiment of the present application. As shown in FIG. 2B, index node 250 and leaf node 264 are shared by root node 240 of a first B+ tree (e.g., a parent snapshot B+ tree) and root node 242 of a second B+ tree (e.g., a child snapshot B+ tree) generated from the first B+ tree. This way, the two root nodes 240 and 242 may share the data of the tree without having to duplicate the entire data of the tree. Further, root node 240 may exclusively own leaf node 266, while root node 242 may exclusively own leaf node 268.

Figure 3:
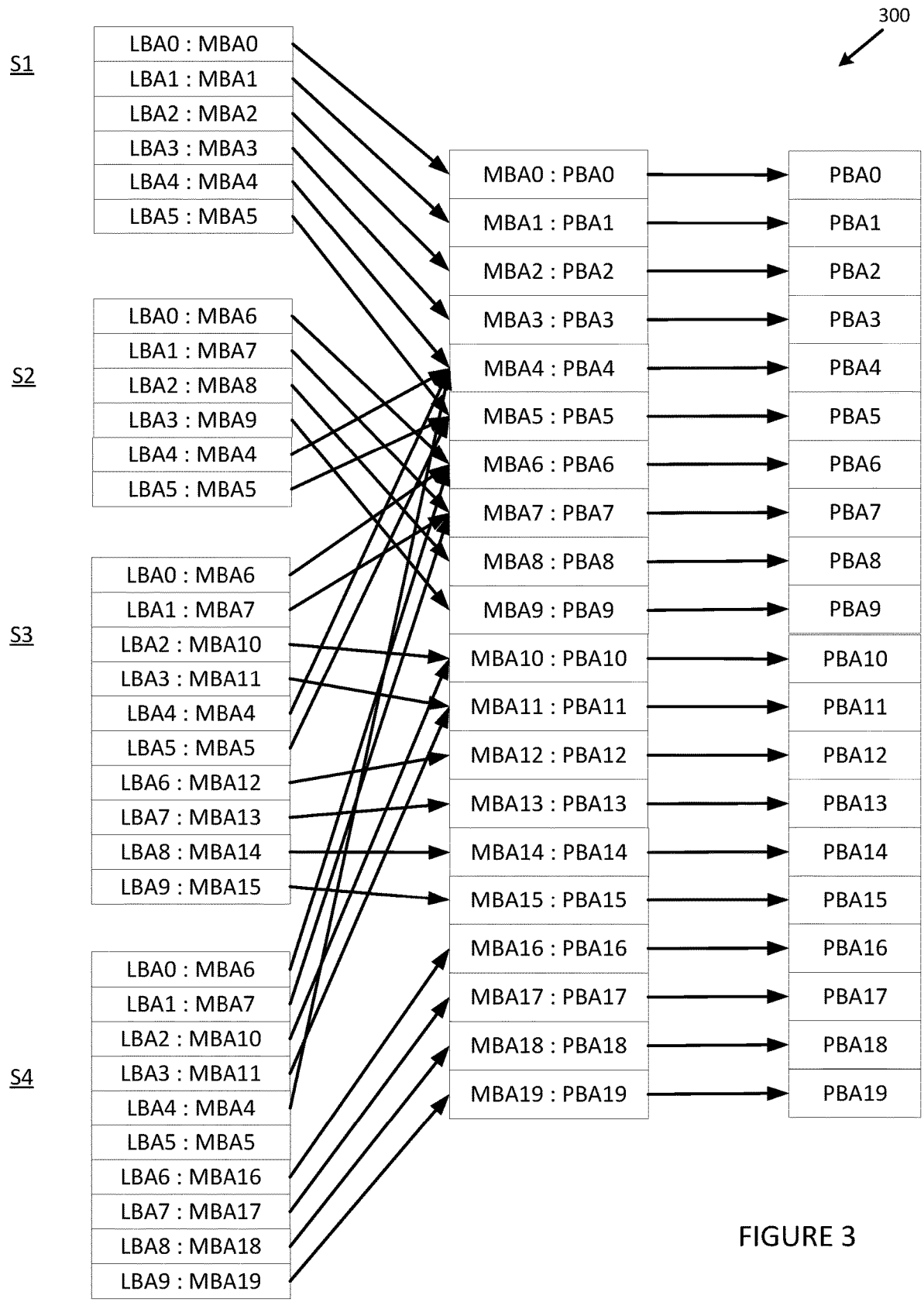
FIG. 3 is a diagram illustrating example two-layer snapshot extent mapping architecture for four example snapshots according to an example embodiment of the present application.

In certain embodiments, the logical map(s) associated with one or more snapshots are a B+ tree using a COW approach, as illustrated in FIG. 2B, while the middle map is a regular B+ tree, as illustrated in FIG. 2A. FIGS. 3, 4A, and 4B illustrate example B+ trees used to manage metadata of four example snapshots, according to an example embodiment of the present disclosure. More specifically, FIG. 3 is a diagram 300 illustrating example two-layer snapshot extent mapping architecture for the four example snapshots, while FIG. 4A is a COW B+ tree 400A used to manage logical map extents for the logical address to middle address mapping of each of the four snapshots and FIG. 4B is a B+ tree 400B used to manage middle map extents for the MBA to PBA mapping for each of the four snapshots.

As shown in FIG. 3, the first layer of the two-layer snapshot extent mapping architecture includes four snapshot logical maps. The schema of each of the snapshot logical maps stores tuples corresponding to key-value pairs of <LBA, MBA> mappings for data blocks associated with each LBA. Similarly, the second layer of the two-layer snapshot extent mapping architecture includes a middle map which stores tuples corresponding to key-value pairs of <MBA, PBA> mappings for data blocks associated with each MBA.

In the example of FIG. 3, a logical map of a first snapshot, S1, may include six logical map extents corresponding to LBAs 1-6. Instead of mapping each of these LBAs to PBAs corresponding to physical locations where data associated with each LBA is written, a middle map extent is created for each LBA, and each logical map extent for each LBA points to its corresponding middle map extent which further points to a PBA where its corresponding data is written. Similar logical map extents and middle map extents are created for a second snapshot, S2, a third snapshot, S3, and a fourth snapshot, S4. However, where a logical map has not been updated from the time S1, or another prior snapshot, was taken to a time S2, S3, and/or S4 was taken, snapshot logical maps for S2, S3, and/or S4 may include identical mapping information for the same LBA (e.g., mapped to a prior created middle map extent). In other words, data blocks may be shared among S1, S2, S3, and/or S4; thus, the number of references pointing to the same MBA (and PBA) may be greater than one.

For example, as shown in FIG. 3, LBA4 of S1, LBA4 of S2, LBA4 of S3, and LBA4 of S4 all map to PBA4. Instead of mapping each of these references to the same PBA, a middle map extent is created, and each reference points to the middle map extent specific for PBA4 (e.g., MBA4). In this case, LBA4 of S1 may be stored in S1's logical map as a tuple of <LBA4, MBA4>, LBA4 of S2 may be stored in S2's logical map as a tuple of <LBA4, MBA4>, LBA4 of S3 may be stored in S3's logical map as a tuple of <LBA4, MBA4>, and LBA4 of S4 may be stored in S4's logical map as a tuple of <LBA4, MBA4>. At the middle map, a tuple of <MBA4, PBA4> may be stored.

Accordingly, if data block content referenced by LBA4 of S1, S2, S3, and S4 is moved from PBA4 to another PBA, for example, PBA25, only the single extent at the middle map can be updated to reflect the change of the PBA for all of the LBAs which reference that data block. This two-layer architecture reduces I/O overhead by not requiring the system to update multiple references to the same PBA extent at different snapshot logical maps. Additionally, the proposed two-layer snapshot extent architecture removes the need to keep another data structure to find all snapshot logical map pointers pointing to a middle map.

As mentioned, FIG. 4A is a COW B+ tree 400A used to manage logical map extents for the logical address to middle address mapping of each of the four snaphsots illustrated in FIG. 3. As illustrated in example COW B+ tree 400A, tuples of logical map extents corresponding to each snapshot's logical map may be stored at leaf nodes 420-438 of COW B+ tree 400A. For example, the logical map associated with S1 includes six logical map extents corresponding to tuples <LBA0, MBA0>, <LBA1, MBA1>, <LBA2, MBA2>, <LBA3, MBA3>, <LBA4, MBA4>, and <LBA5, MBA5>. Each of these tuples may be stored at leaf nodes 420-424, respectively, for the B+ tree logical map corresponding to S1. Although example COW B+ tree 400A in FIG. 4A illustrates leaf nodes storing metadata (e.g., tuples) for two logical map extents, in certain other embodiments, any number of tuples (e.g., one, three, four, etc.) may be stored per leaf node.

Further, the logical map associated with S2 includes six logical map extents corresponding to tuples <LBA0, MBA6>, <LBA1, MBA7>, <LBA2, MBA8>, <LBA3, MBA9>, <LBA4, MBA4>, and <LBA5, MBA5>. Because data associated with LBA4 and LBA5 was not overwritten between the time when S1 was created and when S2 was created, leaf nodes in the B+ tree logical map for S2 containing a tuple for each of LBA4 and LBA5 are leaf nodes shared with the B+ tree logical map for S1. For example, as illustrated in FIG. 4A, leaf node 424 containing tuples of <LBA4, MBA4> and <LBA5, MBA5> may be shared by both root node 410 of the B+ tree logical map for S1 and root node 412 of the B+ tree logical map for S2.

On the other hand, because data associated with LBA0, LBA1, LBA2, and LBA3 was overwritten between the time when S1 was created and when S2 was created, leaf nodes in the B+ tree logical map for S2 containing a tuple for each of LBA0, LBA1, LBA2, and LBA3 are leaf nodes created for the B+ tree logical map for S2, and are not leaf nodes shared with S1. For example, as illustrated in FIG. 4A, leaf nodes 426 and 428 containing tuples of <LBA0, MBA6>, <LBA1, MBA7>, <LBA2, MBA8>, <LA3, MBA9>, respectively, may be pointed to by root node 412 of the B+ tree logical map for S2 but not pointed to by root node 410 of the B+ tree logical map for S1. The B+ tree logical maps for S3 and S4 may be created similarly based on metadata for each of these snapshots in the snapshot extent mapping architecture illustrated in FIG. 3.

Further, as mentioned, FIG. 4B is an example B+ tree 400B used to manage middle map extents for the middle address to physical address mapping for each of the four snapshots illustrated in FIG. 3. As illustrated in example B+ tree 400B, tuples of middle map extents may be stored at leaf nodes 460-478 of example B+ tree 400B. For example, the middle map associated with S1, S2, S3, and S4 includes twenty middle map extents corresponding to tuples of <MBA, PBA> for MBA0-MBA19. Each of these tuples may be stored at leaf nodes 460-478, where each leaf node stores metadata for two logical map extents. Index nodes 450-458 in B+ tree 400B may each include pointers to different leaf nodes. For example, index node 450 may include a first pointer to leaf node 460 and a second pointer to leaf node 462, index node 452 may include a first pointer (e.g., also referred to herein as the third pointer) to leaf node 464 and a second pointer (e.g., also referred to herein as the fourth pointer) to leaf node 466, etc.

Although example B+ tree 400B in FIG. 4B illustrates leaf nodes storing metadata (e.g., tuples) for two middle map extents, in certain other embodiments, any number of tuples (e.g., one, three, four, etc.) may be stored per leaf node. Further although example B+ tree 400B in FIG. 4B illustrates two points per index node to two different leaf nodes, an index node may have any number of pointers (e.g., one, three, four, etc.) to a corresponding number of leaf nodes.

Contents of each root node, index node, and leaf node in B+ tree 400B may belong to a different page. Thus, any update to metadata stored in B+ tree 400B may cause an update to one or more pages, or in other words, one or more I/O page costs may be needed to update the data stored in B+ tree 400B. For example, where middle map extents associated with MBA0, MBA1, MBA2, and MBA3 are to be deleted, contents of four different pages may need to be updated. In particular, a page associated with root node 440, index node 450, leaf node 462, and leaf node 464 may be required to delete these extents.

As shown in FIG. 3, FIG. 4A, and FIG. 4B, data blocks may be shared between snapshots (e.g., where multiple logical map extents of different snapshots point to a same middle map extent) or exclusively owned by a snapshot (e.g., where a middle map extent is pointed by a single logical map extent). Accordingly, when a snapshot is to be deleted, prior to deletion of the snapshot, data blocks of the snapshot may be categorized as shared data blocks or data blocks exclusively owned by the snapshot. Only those data blocks determined to be exclusively owned by the snapshot may be deleted. Data blocks determined to be shared with a child snapshot may be "inherited" by a snapshot which shares the data block when one of the snapshots sharing the data block is deleted.

For example, assuming three snapshots, e.g., S1, S2, S3, of the four example snapshots illustrated in FIGS. 3, 4A, and 4B are requested to be deleted while S4 is to be maintained, as a first step to the deletion of S1, S2, and S3, VSAN module 108, and more specifically zDOM sub-module 132, may determine which data blocks are exclusively owned by S1, S2, and S3 meaning any data blocks that are either (1) exclusively owned individually by any one of S1, S2, or S3; or (2) not exclusively owned individually by any one of S1, S2, or S3 but are shared between only S1, S2, and/or S3 and no other snapshots (e.g., a data block shared between only S1 and S2, a data block only shared between only S2 and S3, etc.), such that only metadata associated with these data blocks exclusively owned by S1, S2, and S3 are deleted. In this example, zDOM sub-module 132 may determine that extents associated with MBA0, MBA1, MBA2, MBA3, MBA8, MBA9, MBA12, MBA13, MBA14, and MBA15 are to be deleted. zDOM sub-module 132 may determine that extents associated with MBA4, MBA5, MBA6, MBA7, MBA10, and MBA11 are not to be deleted as they are extents shared between one or more of S1, S2, and S3 and S4 (e.g., meaning extents associated with these MBAs point to data blocks which are not exclusively owned by S1, S2, and S3).

The identified, exclusively owned middle map extents are then added to a batch for deletion. A transaction (e.g., a set of operations that form a logical unit of work), generally, is used to execute the deletion of the extents added to the batch. Accordingly, prior to committing the updates to the metadata to the disk (e.g., prior to deleting the extents stored on the disk), a record of each database update is to be added to a transaction journal (e.g., a metadata update log). In particular, during the snapshot deletion, one or more pages from VSAN 116 are loaded into memory 114, where the pages include extents in the batch to be deleted. The pages loaded in memory 114 are modified to delete extents added to the batch. Pages in memory 114 that have been modified are marked as "dirty" and have to be flushed to the disk before they can be freed. However, prior to flushing the pages to the disk, "dirty" pages are to first be journaled (e.g., updates added as records to the transaction journal).

For example, using the previous example, given middle map extents associated with MBA0, MBA1, MBA2, MBA3, MBA8, MBA9, MBA12, MBA13, MBA14, and MBA15 are to be deleted, contents of up to nine different pages may need to be updated. In particular, a first page associated with index node 450, a second page associated with leaf node 462, and a third page associated with leaf node 464 may need to be updated to delete extents and update the metadata for MBA0, MBA1, MBA2, and MBA3. A fourth page associated with index node 454 and a fifth page associated with leaf node 468 may need to be updated to delete extents and update the metadata for MBA8 and MBA9. A sixth page associated with index node 456, a seventh page associated with leaf node 472, and an eighth page associated with leaf node 474 may need to be updated to delete extents and update the metadata for MBA12, MBA13, MBA14, and MBA15. A ninth page associated with root node 440 may also need to be updated. Each of these nine pages may need to be journaled after being modified, and prior to being committed to the disk.

Further, although not illustrated by the example, in some cases, updates to one or more pages may cause a merging of neighbor pages. Merging of neighbor pages may also increase the number of pages that are to be modified and journaled to process a transaction.

Journaling updates to a large number of pages, such as eight pages in the example provided, may adversely affect the database system performance. In particular, an increase in the journaling of data increases an amount of memory resources needed to perform such journaling, which in some cases, may starve other transactions of resources. Additionally, a decrease in the availability of memory resources may cause a delay in system performance. Further, flushing of a large number of "dirty" pages to the disk after journaling has been performed results in a greater likelihood of interface occurring to incoming I/O read and/or writes to VSAN 116. In particular, high metadata log traffic may result in a high rate of log truncation which may reduce "dirty" page write amortization, increase "dirty" page write-back traffic, contend additional bandwidth, and/or reduce snapshot running point (e.g., a root node of a B+ tree that is traversed for reads and writes that occur after the most recent snapshot was taken) performance.

Accordingly, aspects of the present disclosure introduce improved techniques for snapshot deletion (e.g., snapshot extent deletion) using micro-batch processing. As mentioned, micro-batch processing refers to the practice of collecting keys of extents (e.g., MBAs of middle map extents) to be deleted in micro-batches for the purposes of taking action on (e.g., processing) data associated with those keys. In particular, MBAs of middle map extents associated with data blocks exclusively owned by snapshots to be deleted are collected in a batch and further split into smaller batches for deletion, to respect transaction limits. In addition, to reduce transaction journaling of metadata for the deletion of such middle map extents allocated to each micro-batch, techniques described herein assign extents, associated with data blocks to be deleted, to different micro-batches (e.g., in some cases with different sizes) such that a number of pages to be updated when processing each micro-batch is minimized.

Figure 5:
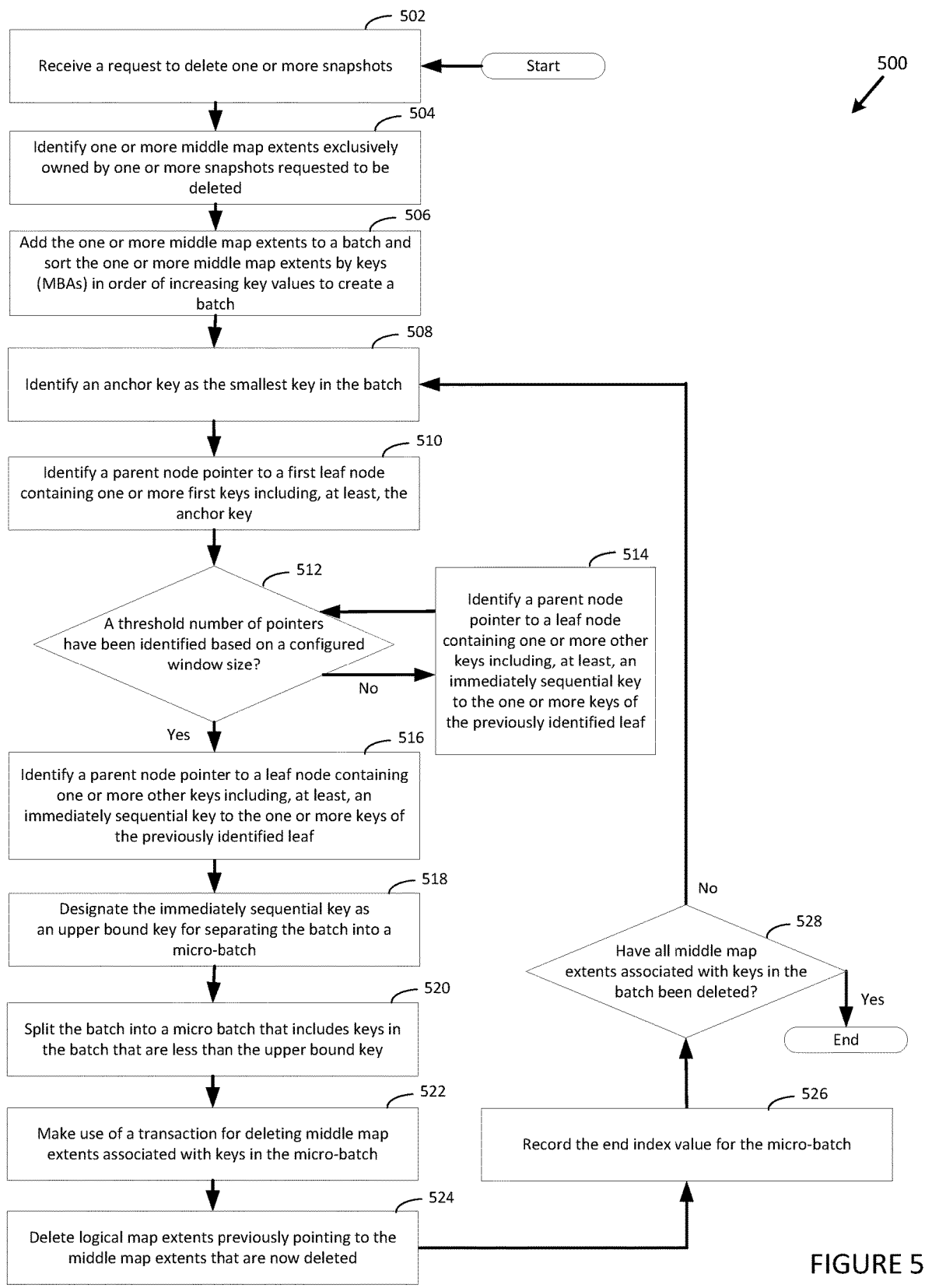
FIG. 5 is an example workflow for snapshot deletion using micro-batch processing, according to an example embodiment of the present application.

FIG. 5 is an example workflow 500 for snapshot deletion using micro-batch processing, according to an example embodiment of the present application. Workflow 500 may be performed by zDOM sub-module 132, illustrated in FIG. 1, to delete snapshots in the snapshot chain.

Figure 7:
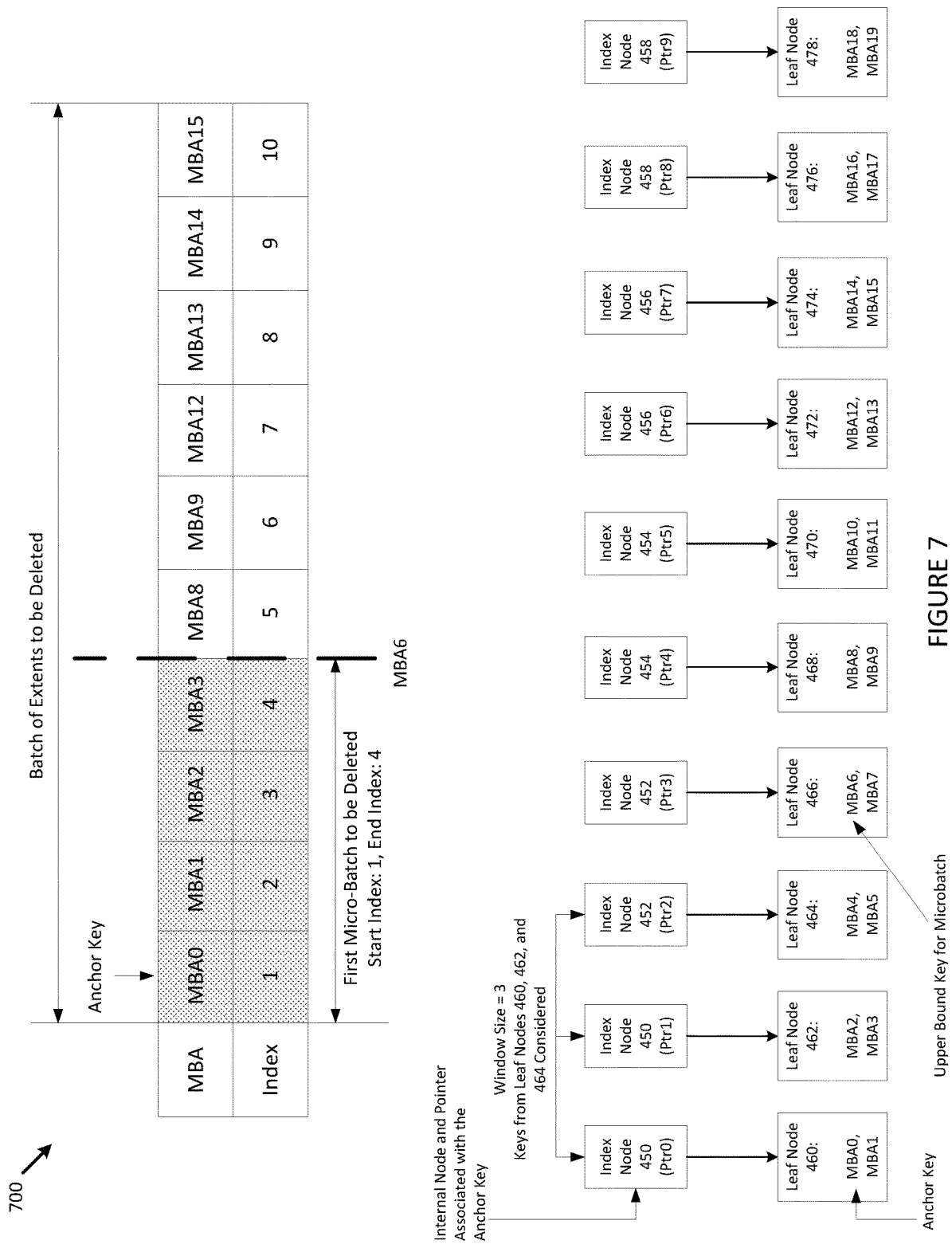
Figure 8:
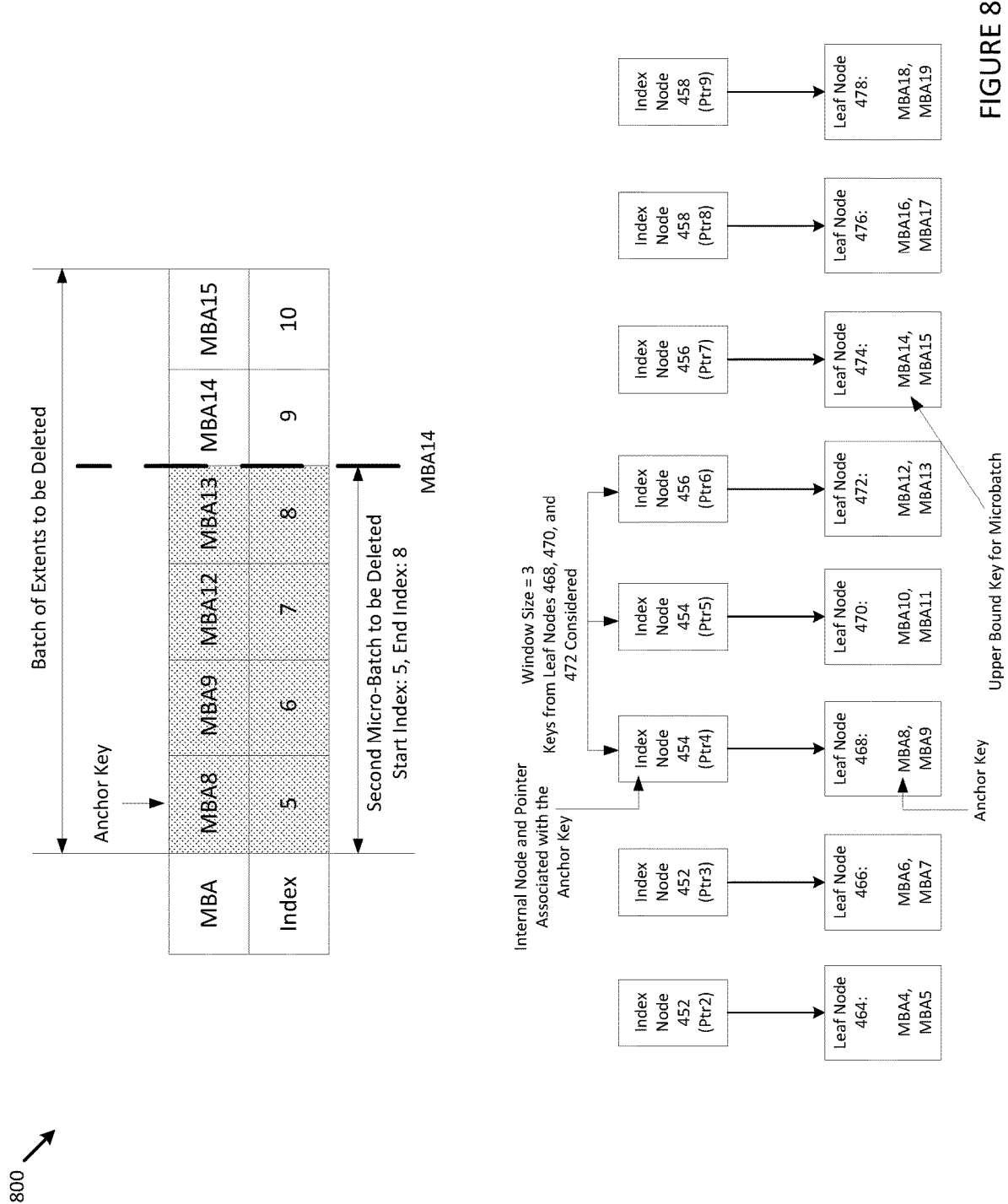
Figure 9:
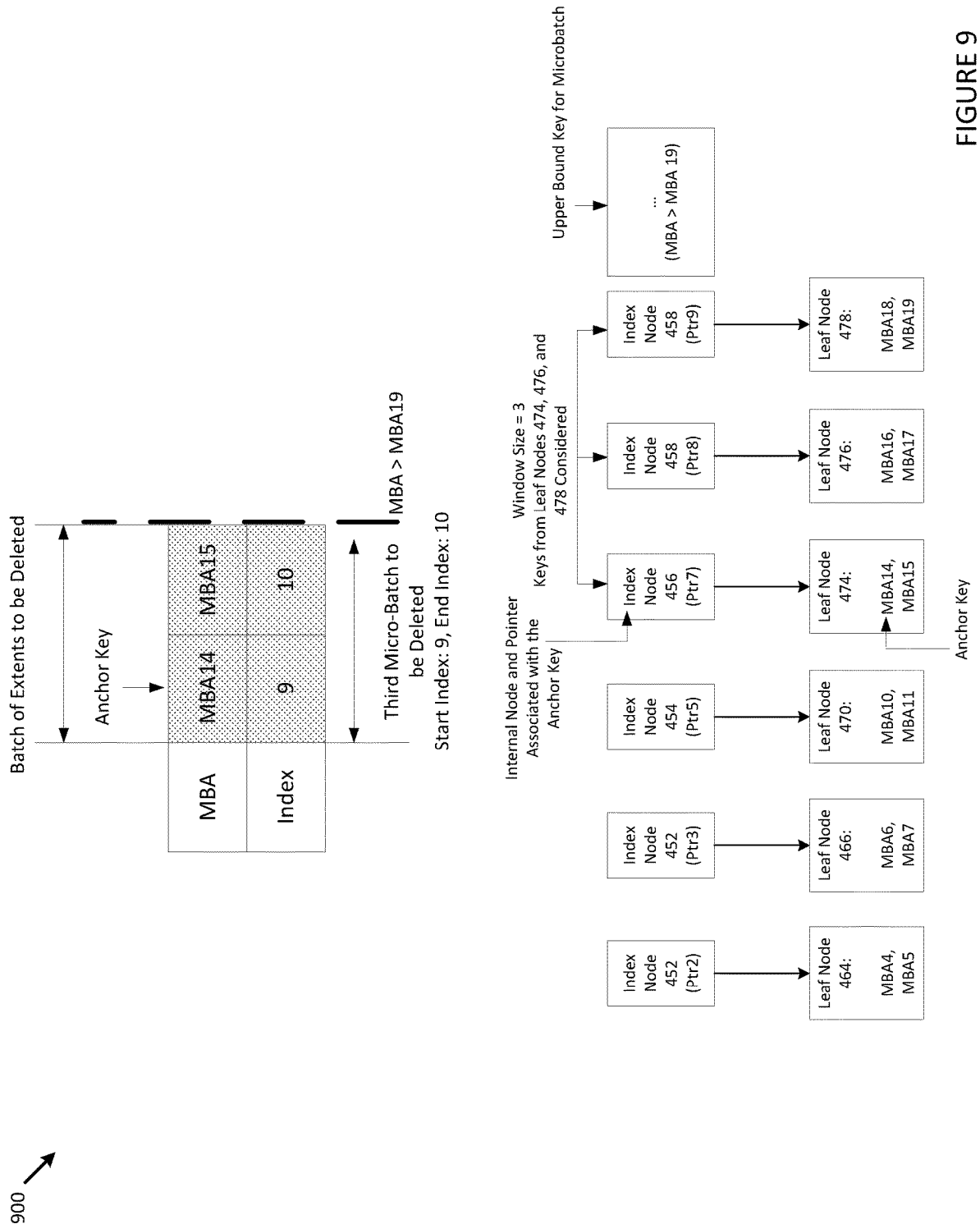

For ease of illustration, workflow 500 is described with respect to the deletion of extents for the three snapshots, S1, S2, and S3, of the four example snapshots illustrated in FIGS. 3, 4A, and 4B. The deletion of such extents using micro-batch processing is illustrated in FIG. 6-9. More specifically, diagram 600 of FIG. 6 illustrates keys associated with middle map extents determined to be deleted for the deletion of S1, S2, and S3. FIG. 7 illustrates a first iteration to determine a first micro-batch for deleting a first subset of middle map extents associated with keys in the batch, FIG. 8 illustrates a second iteration to determine a second micro-batch for deleting a second subset of middle map extents associated with keys in the batch, and FIG. 9 illustrates a third iteration to determine a third micro-batch for deleting a third subset of middle map extents associated with keys in the batch.

Workflow 500 may begin, at operation 502, by zDOM sub-module 132 receiving a request to delete one or more snapshots. For example, the request received by zDOM sub-module 132 may be a request to delete snapshots S1, S2, and S3.

Subsequently, at operation 504, zDOM sub-module 132 identifies one or more middle map extents exclusively owned by the one or more snapshots requested to be deleted. In particular, the request to delete snapshots S1, S2, and S3 prompts zDOM sub-module 132 to initially determine which data blocks are exclusively owned by S1, S2, and S3, such that only metadata (e.g., extents) associated with data blocks exclusively owned by S1, S2, and S3 are deleted. In this example, zDOM sub-module 132 determines that extents associated with MBA0, MBA1, MBA2, MBA3, MBA8, MBA9, MBA12, MBA13, MBA14, and MBA15 (e.g., keys) are to be deleted.

At operation 506, the one or more middle map extents identified at operation 504 (e.g., identified at operation 504 to be exclusively owned middle map extents) are added to a batch for deletion. The extents are identified in the batch based on their associated key (e.g., associated MBA). The extents are also reorganized in the batch in order of increasing key values (e.g., a first key in the batch is the lowest key among all keys in the batch and a last key in the batch is a highest key among all keys in the batch). Specifically, FIG. 6 illustrates keys organized based on increasing key values such that MBA0 is the first key in the batch and MBA15 is the last key in the batch. After reorganizing the keys, each key is assigned a monotonically increased index value. As described in more detail below, an index value may be recorded at a time after processing each micro-batch such that if a crash occurs during the processing of a subsequent micro-batch, zDOM sub-module 132 may know what extents have been deleted and what extents still need to be deleted after recovering from the crash using the recorded index value.

After keys associated with extents to be deleted have been added to the batch, reorganized, and indexed, a first iteration to determine a first micro-batch for processing is performed. The first iteration used to determine the first micro-batch for deleting a first subset of middle map extents associated with keys in the batch is illustrated in FIG. 7.

In particular, as a first step of the first iteration, at operation 508, an anchor key in the batch of extents to be deleted is identified. The anchor key is the lowest key among the keys in the current batch.

As shown in FIG. 7, during a first iteration for deleting a subset of extents associated with keys in a batch, the anchor key is the lowest key in the entire batch of keys associated with extents that are to be deleted. However, after a first micro-batch is processed, the number of keys in the batch is reduced (e.g., keys for extents which were deleted in the first micro-batch are removed from the batch) and the next determined anchor key for the next iteration to determine and process a next micro-batch will be different than the first determined anchor key. In the example illustrated in FIG. 7, the anchor key is determined to be MBA0.

At operation 510, zDOM sub-module 132 identifies a parent node pointer to a first leaf node containing one or more first keys including, at least, the anchor key. For example, as shown in FIG. 7, MBA0 (e.g., the anchor key) is located in leaf node 460. A parent node pointer to leaf node 460 (e.g., containing MBA0) is determined to be Pointer 0 (Ptr0) for index node 450 (also illustrated in B+ tree 400 of FIG. 4B).

At operation 512, zDOM sub-module 132 determines whether a threshold number of pointers have been identified based on a configured window size. As used herein, a window size corresponds a maximum number of pointers to leaf nodes with extents to consider. A window size may be preconfigured to limit a number of pages per micro-batch such that the transaction size and transaction journaling overhead is limited.

For example, in the example illustrated in FIG. 7, the window size is configured to be three. Accordingly, extents of three leaf nodes pointed to by three different pointers (e.g., of one or more parent nodes to the leaf nodes) may be considered. At this point, only one pointer, Ptr0 of index node 450 has been identified. Accordingly, given three pointers have not been identified, at operation 512, zDOM sub-module 132 determines a threshold number of pointers have not been identified based on the configured window size.

Where at operation 512, zDOM sub-module 132 determines a threshold number of pointers have not been identified based on the configured window size, at operation 514, zDOM sub-module 132 identifies a parent node pointer to another leaf node containing one or more other keys including, at least, an immediately sequential key to the one or more keys of the previously identified leaf.

For example, as shown in FIG. 7, the leaf node previously identified at operation 510 was leaf node 460. Thus, at operation 514, zDOM sub-module 132 identifies Pointer 1 (Ptr1) for index node 450 as the parent node pointer because Ptr1 points to another leaf node, e.g., leaf node 462, which contains one or more other keys including, at least, an immediately sequential key to the one or more keys of leaf node 460. In particular, leaf node 460 stores keys MBA0, MBA1; thus, an immediately sequential key to such keys contained in leaf node 460 is MBA2. Because MBA2 exists in leaf node 462 which is pointed to by Ptr1 of index node 450, at operation 514, zDOM sub-module 132 identifies Ptr1 of index node 450.

For this example, when returning back to operation 512 after identifying Ptr1 at operation 514, zDOM sub-module 132 determines a threshold number of pointers has still not been identified based on the configured window size. Specifically, only 2 pointers have been identified, which is less than the threshold identified by the window size.

Accordingly, again at operation 514, zDOM sub-module 132 identifies a parent node pointer to another leaf node containing one or more second keys including, at least, an immediately sequential key to the one or more keys of the previously identified leaf. In this case, zDOM sub-module 132 identifies Pointer 2 (Ptr2) for index node 452 as the parent node pointer because Ptr2 points to another leaf node, e.g., leaf node 464, which contains one or more other keys including, at least, an immediately sequential key to the one or more keys of leaf node 462. In particular, leaf node 462 stores keys MBA2, MBA3; thus, an immediately sequential key to such keys contained in leaf node 462 is MBA4. Because MBA4 exists in leaf node 464 which is pointed to by Ptr2 of index node 452, at operation 514, zDOM sub-module 132 identifies Ptr2 of index node 452.

For this example, when returning back to operation 512 after identifying Ptr1 and Ptr2 at operation 514, zDOM sub-module 132 determines a threshold number of pointers have been identified based on the configured window size.

Specifically, three pointers have been identified, which is equal to the threshold identified by the window size.

Accordingly, at operation 516, zDOM sub-module 132 identifies a parent node pointer to another leaf node containing one or more other keys including, at least, an immediately sequential key to the one or more keys of the previously identified leaf. In this case, zDOM sub-module 132 identifies Pointer 3 (Ptr3) for index node 452 as the parent node pointer because Ptr3 points to another leaf node, e.g., leaf node 466, which contains one or more other keys including, at least, an immediately sequential key to the one or more keys of leaf node 464. In particular, leaf node 464 stores keys MBA4, MBA5; thus, an immediately sequential key to such keys contained in leaf node 464 is MBA6. Because MBA6 exists in leaf node 466 which is pointed to by Ptr3 of index node 452, at operation 516, zDOM sub-module 132 identifies Ptr3 of index node 452.

At operation 518, zDOM sub-module 132 designates the immediately sequential key in the leaf node pointed to by the pointer identified at operation 516 as an upper bound key for separating the batch into a first micro-batch. In this example, at operation 514, zDOM sub-module identifies Ptr3 of index node 452 which points to leaf node 466. The immediately sequential key in leaf node 466 is MBA6; thus, zDOM sub-module 132 designates MBA6 as the upper bound key for separating the batch into the first micro-batch.

At operation 520, zDOM sub-module 132 splits the batch into a micro-batch that includes keys in the batch that are less than the upper bound key. For example, as shown in FIG. 7, zDOM sub-module 132 splits the batch of keys for extents to be deleted using MBA6. In other words, all keys in the batch that are less than MBA6 are keys which are part of the first micro-batch, while all keys that are equal to or greater than MBA6 are keys which are not part of the first micro-batch. Accordingly, keys such as MBA0, MBA1, MBA2, and MBA3 are included in the first micro-batch, while keys such as MBA8, MBA9, MBA12, and MBA13 are not included in the batch (e.g., given that they were previously identified as not exclusively owned).

At operation 522, zDOM sub-module 132 makes use of a transaction for deleting middle map extents associated with keys in the micro-batch. In particular, in FIG. 7, a transaction is used to delete middle map extents associated with MBA0, MBA1, MBA2, and MBA3.

At operation 524, zDOM sub-module 132 deletes logical map extents previously pointing to the middle map extents deleted. For example, as shown in FIG. 3, only one logical map extent is pointing to the middle map extent for MBA0, which is the logical map extent for the tuple <LBA0, MBA0>. Because the middle map extent for MBA0 was deleted at operation 522, the logical map extent for the tuple <LBA0, MBA0> is also deleted. Similarly, logical map extents pointing to middle map extents associated with MBA1, MBA2, and MBA3 are also deleted at operation 524.

At operation 526, zDOM sub-module 132 records the end index value for the first micro-batch processed at operation 522. The end index value may correspond to the last key in the micro-batch that was processed. As mentioned, an index value may be recorded at a time after processing each micro-batch such that if a crash occurs during the processing of a subsequent micro-batch, zDOM sub-module 132 may know what extents have been deleted and what extents still need to be deleted after recovering from the crash. More specifically, if a crash occurs while processing a next micro-batch, zDOM sub-module 132 may use the end index value recorded for a prior processed micro-batch to know which index values corresponding to different keys have not been processed. For example, at operation 526, zDOM sub-module 132 records end index four corresponding to MBA3 such that when a next micro-batch is processed, if a crash occurs, zDOM sub-module would know that at least keys corresponding to index values four or below have been processed (e.g., deleted) to know where to re-start the processing of the subsequent micro-batch. zDOM sub-module 132 may record the end index value in recovery context 146 illustrated in FIG. 1.

At operation 528, zDOM sub-module 132 determines whether all middle map extents associated with keys in the batch have been deleted. Where all middle map extents associated with keys in the batch have been deleted, then workflow 500 is complete. However, where all middle map extents associated with keys in the batch have not been deleted, then workflow 500 returns to operation 508 for a second iteration.

In this example, because only middle map extents associated with MBA0, MBA1, MBA2, and MBA3 were deleted in the first micro-batch, zDOM sub-module 132 determines, at operation 528, that all middle map extents associated with keys in the batch have not been deleted. In particular, zDOM sub-module 132 determines middle map extents associated with MBA8, MBA9, MBA12, MBA13, MBA14, and MBA15 have not been deleted. Accordingly, a second iteration begins to determine a second micro-batch for deleting a second subset of middle map extents associated with keys in the batch. FIG. 8 illustrates the second iteration to determine the second micro-batch for deleting the second subset of middle map extents associated with keys in the batch.

As shown in FIG. 8, zDOM sub-module 132 may repeat operations 508-528 to determine a second micro-batch of middle map extents to be deleted. In particular, at operation 508, zDOM sub-module 132 identifies MBA8 as the anchor key in the batch of extents to be deleted. At operation 510, zDOM sub-module 132 determines that Ptr4 for index node 454 is the parent node pointer to a leaf node (e.g., leaf node 468) containing MBA8 (e.g., the anchor key). At operation 512, zDOM sub-module 132 determines a threshold number of pointers have not been identified based on the configured window size equal to three. Thus, at operation 514, zDOM sub-module 132 identifies Pointer 5 (Ptr5) for index node 454 and Pointer 6 (Ptr6) for index node 456.

At operation 516, zDOM sub-module 132 identifies Pointer 7 (Ptr7) for index node 456 pointing to leaf node 474 containing keys MBA14 and MbA15. zDOM sub-module 132 identifies MBA14 as the immediately sequential key to the keys in leaf node 472. Thus, at operation 518, zDOM sub-module 132 designates MBA14 as the upper bound key for separating the batch into a second micro-batch.

At operation 520, zDOM sub-module 132 splits the batch of keys for extents to be deleted using MBA14. In other words, all keys in the batch currently that are less than MBA14 are keys which are part of the second micro-batch, while all keys that are equal to or greater than MBA14 are keys which are not part of the second micro-batch. Accordingly, keys such as MBA8, MBA9, MBA12, and MBA13 are included in the second micro-batch, while keys such as MBA14 and MBA15 are not included in the second micro-batch.

At operation 522, zDOM sub-module 132 makes use of a transaction for deleting middle map extents associated with keys in the micro-batch. In particular, in FIG. 8, a transaction is used to delete middle map extents associated with MBA8, MBA9, MBA12, and MBA13.

At operation 524, zDOM sub-module 132 deletes logical map extents previously pointing to the middle map extents deleted at operation 522. At operation 526, zDOM sub-module 132 records the end index value, e.g., index value eight, for the second micro-batch processed at operation 522.

At operation 528, zDOM sub-module 132 determines whether all middle map extents associated with keys in the batch have been deleted. In this example, because only middle map extents associated with MBA0, MBA1, MBA2, and MBA3 were deleted in the first micro-batch and middle map extents associated with MBA8, MBA9, MBA12, and MBA13 were deleted in the second micro-batch, zDOM sub-module 132 determines, at operation 528, that all middle map extents associated with keys in the batch have not been deleted. In particular, zDOM sub-module 132 determines middle map extents associated with MBA14 and MBA15 have not been deleted. Accordingly, a third iteration begins to determine a third micro-batch for deleting a third subset of middle map extents associated with keys in the batch. FIG. 9 illustrates the third iteration to determine the third micro-batch for deleting the third subset of middle map extents associated with keys in the batch. As shown in FIG. 9, zDOM sub-module 132 may repeat operations 508-528 to determine a third micro-batch of middle map extents to be deleted.

After performing operations 508-526 for the third iteration, at operation 528, zDOM sub-module 132 determines all middle map extents associated with keys in the batch have been deleted; thus, workflow 300 is complete.

Accordingly, using operations described in workflow 500 to delete middle map extents for S1, S2, and S3 helps to reduce a number of pages which are to be loaded in memory for each transaction, as well as journaled prior to writing the update to the disk.

Techniques described herein for collecting keys of extents (e.g., MBAs of middle map extents) with data blocks exclusively owned by snapshots to be deleted (or shared among only snapshots to be deleted) and splitting the batch in smaller batches for snapshot deletion, may be used to efficiently delete such extents while adhering to a threshold number of pages limit and decreasing transactional journaling overhead. In particular, by exploiting locality of data blocks owned snapshots being deleted when determining which extents are to be added to a micro-batch for processing may help to reduce the number of pages which need to be modified and journaled, thereby reducing the transaction size and decreasing the transaction journal overhead.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for deleting one or more snapshots using micro-batch processing, the method comprising:
   receiving a request to delete the one or more snapshots;
   identifying one or more middle map extents exclusively owned by the one or more snapshots requested to be deleted, wherein metadata for the one or more snapshots is stored in one or more logical maps having logical map extents mapping logical block addresses (LBAs) to middle block addresses (MBAs) and a middle map having middle map extents mapping MBAs to physical block addresses (PBAs) of physical locations where data blocks are written;
adding MBAs of the identified one or more middle map extents to a batch;
determining a first micro-batch including a first subset of the MBAs in the batch, the first subset of MBAs being MBAs less than a first upper bound MBA; and
using a first transaction to delete the middle map extents corresponding to the first subset of MBAs included in the first micro-batch.

2. The method of claim 1, further comprising:
identifying an anchor MBA in the batch as a smallest MBA among the MBAs added to the batch;
identifying a first parent node pointer to a first leaf node containing one or more first MBAs including, at least, the anchor MBA;
identifying one or more second parent node pointers to one or more second leaf nodes containing one or more second MBAs including, at least, an immediately sequential second MBA to one or more MBAs of the leaf node pointed to by the previously identified parent node pointer until a number of parent node pointers identified, including the first parent node pointer, is equal to a threshold number of pointers;
identifying a third parent node pointer to a third leaf node containing one or more third MBAs including, at least, an immediately sequential third MBA to one or more second MBAs of a leaf node pointed by a last identified parent node pointer of the one or more second parent node pointers; and
designating the immediately sequential third MBA as the first upper bound MBA.

3. The method of claim 2, wherein the first leaf node, the one or more second leaf nodes, and the third leaf node belong to a plurality of nodes maintained in an ordered data structure for the one or more snapshots, the plurality of leaf nodes used to manage the middle map extents mapping the MBAs to the PBAs of the physical locations where the data blocks are written.

4. The method of claim 2, wherein the threshold number of pointers is preconfigured.

5. The method of claim 1, wherein the MBAs of the identified one or more middle maps are added to the batch in order of increasing MBA.

6. The method of claim 5, further comprising:
after adding the MBAs of the identified one or more middle map extents to the batch, assigning a monotonically increased index value to each of the MBAs in the batch starting with a first MBA in the batch; and
after using the first transaction to delete the middle map extents corresponding to the first subset of MBAs included in the first micro-batch, recording the index value assigned to a last MBA of the first subset of MBAs.

7. The method of claim 1, wherein using the first transaction to delete the middle map extents corresponding to the first subset of MBAs included in the first micro-batch comprises:
loading, in memory, one or more pages for which the middle map extents corresponding to the first subset of MBAs included in the first micro-batch belong to;
modifying the one or more pages to delete the middle map extents corresponding to the first subset of MBAs included in the first micro-batch;
journaling modifications to the one or more pages; and
flushing the one or more pages to a disk.

8. The method of claim 1, subsequent to using the first transaction to delete the middle map extents corresponding to the first subset of MBAs included in the first micro-batch, further comprising:
determining additional micro-batches including additional subsets of the MBAs remaining in the batch, the additional subsets of MBAs being MBAs less than other upper bound MBAs; and
using additional transactions to delete the middle map extents corresponding to the additional subsets of MBAs included in the additional micro-batches until all the middle map extents corresponding to all the MBAs in the batch have been deleted.

9. A system comprising:
one or more processors; and
at least one memory, the one or more processors and the at least one memory configured to cause the system to:
receive a request to delete one or more snapshots;
identify one or more middle map extents exclusively owned by the one or more snapshots requested to be deleted, wherein metadata for the one or more snapshots is stored in one or more logical maps having logical map extents mapping logical block addresses (LB As) to middle block addresses (MBAs) and a middle map having middle map extents mapping MBAs to physical block addresses (PBAs) of physical locations where data blocks are written;
add MBAs of the identified one or more middle map extents to a batch;
determine a first micro-batch including a first subset of the MBAs in the batch, the first subset of MBAs being MBAs less than a first upper bound MBA; and
use a first transaction to delete the middle map extents corresponding to the first subset of MBAs included in the first micro-batch.

10. The system of claim 9, wherein the one or more processors and the at least one memory are further configured to cause the system to:
identify an anchor MBA in the batch as a smallest MBA among the MBAs added to the batch;
identify a first parent node pointer to a first leaf node containing one or more first MBAs including, at least, the anchor MBA;
identify one or more second parent node pointers to one or more second leaf nodes containing one or more second MBAs including, at least, an immediately sequential second MBA to one or more MBAs of the leaf node pointed to by the previously identified parent node pointer until a number of parent node pointers identified, including the first parent node pointer, is equal to a threshold number of pointers;
identify a third parent node pointer to a third leaf node containing one or more third MBAs including, at least, an immediately sequential third MBA to one or more second MBAs of a leaf node pointed by a last identified parent node pointer of the one or more second parent node pointers; and
designate the immediately sequential third MBA as the first upper bound MBA.

11. The system of claim 10, wherein the first leaf node, the one or more second leaf nodes, and the third leaf node belong to a plurality of nodes maintained in an ordered data structure for the one or more snapshots, the plurality of leaf nodes used to manage the middle map extents mapping the MBAs to the PBAs of the physical locations where the data blocks are written.

12. The system of claim 10, wherein the threshold number of pointers is preconfigured.

13. The system of claim 9, wherein the MBAs of the identified one or more middle maps are added to the batch in order of increasing MBA.

14. The system of claim 13, wherein the one or more processors and the at least one memory are further configured to cause the system to:
after adding the MBAs of the identified one or more middle map extents to the batch, assign a monotonically increased index value to each of the MBAs in the batch starting with a first MBA in the batch; and
after using the first transaction to delete the middle map extents corresponding to the first subset of MBAs included in the first micro-batch, record the index value assigned to a last MBA of the first subset of MBAs.

15. The system of claim 9, wherein the one or more processors and the at least one memory are configured to cause the system to use the first transaction to delete the middle map extents corresponding to the first subset of MBAs included in the first micro-batch by:
loading, in memory, one or more pages for which the middle map extents corresponding to the first subset of MBAs included in the first micro-batch belong to;
modifying the one or more pages to delete the middle map extents corresponding to the first subset of MBAs included in the first micro-batch;
journaling modifications to the one or more pages; and
flushing the one or more pages to a disk.

16. The system of claim 9, wherein subsequent to using the first transaction to delete the middle map extents corresponding to the first subset of MBAs included in the first micro-batch, the one or more processors and the at least one memory are further configured to:
determine additional micro-batches including additional subsets of the MBAs remaining in the batch, the additional subsets of MBAs being MBAs less than other upper bound MBAs; and
use additional transactions to delete the middle map extents corresponding to the additional subsets of MBAs included in the additional micro-batches until all the middle map extents corresponding to all the MBAs in the batch have been deleted.

17. A non-transitory computer-readable medium comprising instructions that, when executed by one or more processors of a computing system, cause the computing system to perform operations for deleting one or more snapshots using micro-batch processing, the operations comprising:
receiving a request to delete the one or more snapshots;
identifying one or more middle map extents exclusively owned by the one or more snapshots requested to be deleted, wherein metadata for the one or more snapshots is stored in one or more logical maps having logical map extents mapping logical block addresses (LBAs) to middle block addresses (MBAs) and a middle map having middle map extents mapping MBAs to physical block addresses (PBAs) of physical locations where data blocks are written;
adding MBAs of the identified one or more middle map extents to a batch;
determining a first micro-batch including a first subset of the MBAs in the batch, the first subset of MBAs being MBAs less than a first upper bound MBA; and
using a first transaction to delete the middle map extents corresponding to the first subset of MBAs included in the first micro-batch.

18. The non-transitory computer-readable medium of claim 17, wherein the operations further comprise:
identifying an anchor MBA in the batch as a smallest MBA among the MBAs added to the batch;
identifying a first parent node pointer to a first leaf node containing one or more first MBAs including, at least, the anchor MBA;
identifying one or more second parent node pointers to one or more second leaf nodes containing one or more second MBAs including, at least, an immediately sequential second MBA to one or more MBAs of the leaf node pointed to by the previously identified parent node pointer until a number of parent node pointers identified, including the first parent node pointer, is equal to a threshold number of pointers;
identifying a third parent node pointer to a third leaf node containing one or more third MBAs including, at least, an immediately sequential third MBA to one or more second MBAs of a leaf node pointed by a last identified parent node pointer of the one or more second parent node pointers; and
designating the immediately sequential third MBA as the first upper bound MBA.

19. The non-transitory computer-readable medium of claim 18, wherein the first leaf node, the one or more second leaf nodes, and the third leaf node belong to a plurality of nodes maintained in an ordered data structure for the one or more snapshots, the plurality of leaf nodes used to manage the middle map extents mapping the MBAs to the PBAs of the physical locations where the data blocks are written.

20. The non-transitory computer-readable medium of claim 18, wherein the threshold number of pointers is preconfigured.

* * * * *